(12) United States Patent
Bajic et al.

(10) Patent No.: US 7,370,911 B2
(45) Date of Patent: May 13, 2008

(54) AUTOMOTIVE VEHICLE SEAT INSERT

(75) Inventors: Goran Bajic, Windsor (CA); Lindy Brennan, Windsor (CA); Scott Truant, Windsor (CA); Madalina Onica, Windsor (CA)

(73) Assignee: W.E.T. Automotive Systems, AG, Odelzhausen (DE)

( * ) Notice: Subject to any disclaimer, the term of this patent is extended or adjusted under 35 U.S.C. 154(b) by 0 days.

(21) Appl. No.: 10/966,653

(22) Filed: Oct. 15, 2004

(65) Prior Publication Data

US 2005/0140189 A1 Jun. 30, 2005

Related U.S. Application Data

(60) Provisional application No. 60/512,230, filed on Oct. 17, 2003.

(51) Int. Cl.
*A47C 7/72* (2006.01)

(52) U.S. Cl. ............... 297/180.12; 297/180.11; 297/180.14

(58) Field of Classification Search ........... 297/180.1, 297/180.11, 180.13, 180.14, 452.42, 452.43
See application file for complete search history.

(56) References Cited

U.S. PATENT DOCUMENTS

| 374,424 A | 12/1887 | Ober |
| 390,154 A | 9/1888 | Beach |
| 1,370,832 A | 3/1921 | Mollberg |
| 1,439,681 A | 12/1922 | Alkire et al. |
| 1,475,912 A | 11/1923 | Williams |
| 1,514,329 A | 11/1924 | Metcalf |
| 1,537,460 A | 5/1925 | Campbell et al. |
| 1,541,213 A | 6/1925 | Harley |
| 1,593,066 A | 7/1926 | Gaston |
| 1,664,636 A | 4/1928 | Mayer |
| 1,837,515 A | 12/1931 | Bachrach |
| 1,936,960 A | 11/1933 | Bowman |
| 2,022,959 A | 12/1935 | Gordon |
| 2,103,553 A | 12/1937 | Reynolds |
| 2,158,801 A | 5/1939 | Petterson |
| 2,336,089 A | 12/1943 | Gould |
| 2,493,303 A | 1/1950 | McCullough |
| 2,544,506 A | 6/1951 | Kronhaus |

(Continued)

FOREIGN PATENT DOCUMENTS

CA 1266925 7/1960

(Continued)

OTHER PUBLICATIONS

About I-Car, Current events/News: e-newsletters: Advantage Online, Aug. 27, 2001.

(Continued)

*Primary Examiner*—Anthony D. Barfield
(74) *Attorney, Agent, or Firm*—Dobrusin & Thennisch PC (57) ABSTRACT

There is disclosed a sealed edge insert suitable for placement within a seat of an automotive vehicle. The insert includes multiple layers, one of which includes a heater for providing an occupant of the seat with warmth. The insert also includes an air mover (e.g., a fan) for providing ventilation to the seat occupant. Further, the insert includes an extension that extends to a backside of a cushion component of the seat for attachment to provide fluid communication from the insert to the air mover.

15 Claims, 8 Drawing Sheets

U.S. PATENT DOCUMENTS

| | | |
|---|---|---|
| 2,703,134 A | 3/1955 | Mossor |
| 2,749,906 A | 6/1956 | O'Connor |
| 2,758,532 A | 8/1956 | Awe |
| 2,782,834 A | 2/1957 | Vigo |
| 2,791,956 A | 5/1957 | Guest |
| 2,826,135 A | 3/1958 | Benzick |
| 2,912,832 A | 11/1959 | Clark |
| 2,931,286 A | 4/1960 | Fry, Sr. et al. |
| 2,976,700 A | 3/1961 | Jackson |
| 2,978,972 A | 4/1961 | Hake |
| 2,992,604 A | 7/1961 | Trotman et al. |
| 2,992,605 A | 7/1961 | Trotman et al. |
| 3,030,145 A | 4/1962 | Kotteman |
| 3,101,037 A | 8/1963 | Taylor |
| 3,101,660 A | 8/1963 | Taylor |
| 3,127,931 A | 4/1964 | Johnson |
| 3,131,967 A | 5/1964 | Spaulding |
| 3,136,577 A | 6/1964 | Richard |
| 3,137,523 A | 6/1964 | Karner |
| 3,162,489 A | 12/1964 | Trotman |
| 3,209,380 A | 10/1965 | Watsky |
| 3,486,177 A | 12/1969 | Marshack |
| 3,529,310 A | 9/1970 | Olmo |
| 3,550,523 A | 12/1970 | Segal |
| 3,552,133 A | 1/1971 | Lukomsky |
| 3,628,829 A | 12/1971 | Hellig |
| 3,638,255 A | 2/1972 | Sterrett |
| 3,653,589 A | 4/1972 | McGrath |
| 3,653,590 A | 4/1972 | Elsea |
| 3,681,797 A | 8/1972 | Messner |
| 3,684,170 A | 8/1972 | Roof |
| 3,732,944 A | 5/1973 | Kendall |
| 3,736,022 A | 5/1973 | Radke |
| 3,738,702 A | 6/1973 | Jacobs |
| 3,757,366 A | 9/1973 | Sacher |
| 3,770,318 A | 11/1973 | Fenton |
| 3,778,851 A | 12/1973 | Howorth |
| 3,948,246 A | 4/1976 | Jenkins |
| 4,002,108 A | 1/1977 | Drori |
| 4,043,544 A | 8/1977 | Ismer |
| 4,044,221 A | 8/1977 | Kuhn |
| 4,060,276 A | 11/1977 | Lindsay |
| 4,065,936 A | 1/1978 | Fenton et al. |
| 4,072,344 A | 2/1978 | Li |
| 4,141,585 A | 2/1979 | Blackman |
| 4,175,297 A | 11/1979 | Robbins et al. |
| 4,245,149 A | 1/1981 | Fairlie |
| 4,259,896 A | 4/1981 | Hayashi et al. |
| 4,268,272 A | 5/1981 | Taura |
| 4,335,725 A | 6/1982 | Geldmacher |
| 4,379,352 A | 4/1983 | Hauslein et al. |
| 4,391,009 A | 7/1983 | Schild et al. |
| 4,413,857 A | 11/1983 | Hayashi |
| 4,509,792 A | 4/1985 | Wang |
| 4,563,387 A | 1/1986 | Takagi et al. |
| 4,572,430 A | 2/1986 | Takagi et al. |
| 4,589,656 A | 5/1986 | Baldwin |
| 4,665,707 A | 5/1987 | Hamilton |
| 4,671,567 A | 6/1987 | Frobose |
| 4,685,727 A | 8/1987 | Cremer et al. |
| 4,712,832 A | 12/1987 | Antolini et al. |
| 4,729,598 A | 3/1988 | Hess |
| 4,777,802 A | 10/1988 | Feher |
| 4,847,933 A | 7/1989 | Bedford |
| 4,853,992 A | 8/1989 | Yu |
| 4,866,800 A | 9/1989 | Bedford |
| 4,905,475 A | 3/1990 | Tuomi |
| 4,923,248 A | 5/1990 | Feher |
| 4,946,220 A | 8/1990 | Wyon et al. |
| 4,964,674 A | 10/1990 | Altmann et al. |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,076,643 A | 12/1991 | Colasanti et al. |
| 5,102,189 A | 4/1992 | Saito et al. |
| 5,106,161 A | 4/1992 | Meiller |
| 5,117,638 A | 6/1992 | Feher |
| 5,138,851 A | 8/1992 | Mardikian |
| 5,160,517 A | 11/1992 | Hicks et al. |
| 5,211,697 A | 5/1993 | Kienlein et al. |
| 5,226,188 A | 7/1993 | Liou |
| 5,292,577 A | 3/1994 | Van Kerrebrouck et al. |
| 5,335,381 A | 8/1994 | Chang |
| 5,354,117 A | 10/1994 | Danielson et al. |
| 5,356,205 A | 10/1994 | Calvert et al. |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II et al. |
| 5,403,065 A | 4/1995 | Callerio |
| 5,408,711 A | 4/1995 | McClelland |
| 5,411,318 A | 5/1995 | Law |
| 5,416,935 A | 5/1995 | Nieh |
| 5,450,894 A | 9/1995 | Inoue et al. |
| 5,516,189 A | 5/1996 | Ligeras |
| 5,524,439 A | 6/1996 | Gallup et al. |
| 5,561,875 A | 10/1996 | Graebe |
| 5,590,428 A | 1/1997 | Roter |
| 5,597,200 A | 1/1997 | Gregory et al. |
| 5,613,729 A | 3/1997 | Summer, Jr. |
| 5,613,730 A | 3/1997 | Buie et al. |
| 5,626,021 A | 5/1997 | Karunasiri et al. |
| 5,626,386 A | 5/1997 | Lush |
| 5,626,387 A | 5/1997 | Yeh |
| 5,639,145 A | 6/1997 | Alderman |
| 5,645,314 A | 7/1997 | Liou |
| 5,692,952 A | 12/1997 | Chih-Hung |
| 5,701,621 A | 12/1997 | Landi et al. |
| 5,715,695 A | 2/1998 | Lord |
| 5,787,534 A | 8/1998 | Hargest et al. |
| 5,833,309 A | 11/1998 | Schmitz |
| 5,833,321 A | 11/1998 | Kim et al. |
| 5,887,304 A | 3/1999 | Von der Heyde |
| 5,897,162 A | 4/1999 | Humes et al. |
| 5,902,014 A | 5/1999 | Dinkel et al. |
| 5,918,930 A | 7/1999 | Kawai et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust |
| 6,003,950 A | 12/1999 | Larsson |
| 6,019,420 A | 2/2000 | Faust et al. |
| 6,048,024 A | 4/2000 | Wallman |
| 6,049,927 A | 4/2000 | Thomas et al. |
| 6,059,018 A | 5/2000 | Yoshinori et al. |
| 6,059,362 A | 5/2000 | Lin |
| 6,062,641 A | 5/2000 | Suzuki et al. |
| 6,064,037 A | 5/2000 | Weiss et al. |
| 6,068,332 A | 5/2000 | Faust et al. |
| 6,079,485 A | 6/2000 | Esaki et al. |
| 6,085,369 A | 7/2000 | Feher |
| 6,105,667 A | 8/2000 | Yoshinori et al. |
| 6,109,688 A | 8/2000 | Wurz et al. |
| 6,119,463 A | 9/2000 | Bell |
| 6,124,577 A | 9/2000 | Fristedt |
| 6,145,925 A | 11/2000 | Eksin et al. |
| 6,147,332 A | 11/2000 | Holmberg et al. |
| 6,164,719 A | 12/2000 | Rauh |
| 6,179,706 B1 | 1/2001 | Yoshinori et al. |

| | | |
|---|---|---|
| 6,186,592 B1 | 2/2001 | Orizaris et al. |
| 6,189,966 B1 | 2/2001 | Faust et al. |
| 6,196,627 B1 | 3/2001 | Faust et al. |
| 6,223,539 B1 | 5/2001 | Bell |
| 6,224,150 B1 | 5/2001 | Eksin et al. |
| 6,237,675 B1 | 5/2001 | Oehring et al. |
| 6,254,179 B1 | 7/2001 | Kortume et al. |
| 6,263,530 B1 | 7/2001 | Feher |
| 6,273,810 B1 | 8/2001 | Rhodes et al. |
| 6,277,023 B1 | 8/2001 | Schwartz |
| 6,278,090 B1 | 8/2001 | Fristedt et al. |
| 6,291,803 B1 | 9/2001 | Fourrey |
| 6,300,150 B1 | 10/2001 | Venkatasubramanian |
| 6,321,996 B1 | 11/2001 | Odebrecht et al. |
| 6,415,501 B1 | 7/2002 | Schlesselman |
| 6,425,637 B1 | 7/2002 | Peterson |
| 6,434,328 B2 | 8/2002 | Rutherford |
| 6,481,801 B1 | 11/2002 | Schmale |
| 6,483,087 B2 | 11/2002 | Gardner et al. |
| 6,491,578 B2 | 12/2002 | Yoshinori et al. |
| 6,497,275 B1 | 12/2002 | Elliot |
| 6,501,055 B2 | 12/2002 | Rock et al. |
| 6,505,886 B2 | 1/2003 | Gielda et al. |
| 6,511,125 B1 | 1/2003 | Gendron |
| 6,539,725 B2 | 4/2003 | Bell |
| 6,541,737 B1 | 4/2003 | Eksin et al. |
| RE38,128 E | 6/2003 | Gallup et al. |
| 6,578,910 B2 | 6/2003 | Andersson et al. |
| 6,592,181 B2 | 7/2003 | Stiller et al. |
| 6,598,405 B2 | 7/2003 | Bell |
| 6,604,785 B2 * | 8/2003 | Bargheer et al. .... 297/180.14 X |
| 6,606,866 B2 | 8/2003 | Bell |
| 6,619,736 B2 | 9/2003 | Stowe et al. |
| 6,625,990 B2 | 9/2003 | Bell |
| 6,626,386 B1 | 9/2003 | Stiner et al. |
| 6,626,455 B2 | 9/2003 | Webber et al. |
| 6,626,488 B2 | 9/2003 | Pfahler |
| 6,629,724 B2 | 10/2003 | Ekern et al. |
| 6,629,725 B1 | 10/2003 | Kunkel et al. |
| 6,682,140 B2 | 1/2004 | Minuth et al. |
| 6,685,553 B2 | 2/2004 | Aoki |
| 6,719,624 B2 | 4/2004 | Hayashi et al. |
| 6,722,148 B2 | 4/2004 | Aoki et al. |
| 6,761,399 B2 | 7/2004 | Bargheer et al. |
| 6,767,621 B2 | 7/2004 | Flick et al. |
| 6,786,541 B2 | 9/2004 | Haupt et al. |
| 6,786,545 B2 | 9/2004 | Bargheer et al. |
| 6,793,016 B2 | 9/2004 | Aoki et al. |
| 6,808,230 B2 | 10/2004 | Buss et al. |
| 6,817,675 B2 | 11/2004 | Buss et al. |
| 6,828,528 B2 | 12/2004 | Stöwe et al. |
| 6,848,742 B1 | 2/2005 | Aoki et al. |
| 6,857,697 B2 | 2/2005 | Brennan et al. |
| 6,869,139 B2 | 3/2005 | Brennan et al. |
| 6,869,140 B2 | 3/2005 | White et al. |
| 6,871,696 B2 | 3/2005 | Aoki et al. |
| 6,886,352 B2 | 5/2005 | Yoshinori et al. |
| 6,892,807 B2 | 5/2005 | Fristedt et al. |
| 6,893,086 B2 | 5/2005 | Bajic et al. |
| 6,929,322 B2 | 8/2005 | Aoki et al. |
| 6,976,734 B2 | 12/2005 | Stoewe |
| 2001/0035669 A1 | 11/2001 | Andersson et al. |
| 2002/0003363 A1 | 1/2002 | Buss et al. |
| 2002/0017102 A1 | 2/2002 | Bell |
| 2002/0067058 A1 | 6/2002 | Pfahler |
| 2002/0092308 A1 | 7/2002 | Bell |
| 2002/0096915 A1 | 7/2002 | Haupt et al. |
| 2002/0096931 A1 | 7/2002 | White et al. |
| 2002/0105213 A1 | 8/2002 | Rauh et al. |
| 2002/0108381 A1 | 8/2002 | Bell |
| 2002/0139123 A1 | 10/2002 | Bell |
| 2002/0140258 A1 | 10/2002 | Ekern et al. |
| 2002/0148234 A1 | 10/2002 | Bell |
| 2002/0148235 A1 | 10/2002 | Bell |
| 2002/0148236 A1 | 10/2002 | Bell |
| 2002/0148345 A1 | 10/2002 | Hagiwari |
| 2002/0150478 A1 | 10/2002 | Aoki |
| 2003/0005706 A1 | 1/2003 | Bell |
| 2003/0024924 A1 | 2/2003 | Fristedt |
| 2003/0029173 A1 | 2/2003 | Bell et al. |
| 2003/0079770 A1 | 5/2003 | Bell |
| 2003/0084935 A1 | 5/2003 | Bell |
| 2003/0102699 A1 | 6/2003 | Aoki et al. |
| 2003/0150229 A1 | 8/2003 | Aoki et al. |
| 2004/0036326 A1 | 2/2004 | Bajic |
| 2004/0104607 A1 | 6/2004 | Takeshi et al. |
| 2004/0118555 A1 | 6/2004 | Fristedt |
| 2004/0139758 A1 | 7/2004 | Toshifumi et al. |
| 2004/0189061 A1 | 9/2004 | Hartwick et al. |
| 2004/0195870 A1 | 10/2004 | Bohlender et al. |
| 2004/0245811 A1 | 12/2004 | Bevan et al. |
| 2005/0200179 A1 | 9/2005 | Bevan et al. |
| 2005/0257541 A1 | 11/2005 | Kadle et al. |
| 2005/0264086 A1 | 12/2005 | Lofy et al. |

FOREIGN PATENT DOCUMENTS

| | | |
|---|---|---|
| CA | 2393970 | 6/2001 |
| DE | 3513909 | 10/1986 |
| DE | 3705756 | 2/1987 |
| DE | 41 12 631 | 4/1992 |
| DE | 19503291 | 8/1996 |
| DE | 19654370 | 3/1998 |
| DE | 197 36 951 | 3/1999 |
| DE | 197 37 636 | 3/1999 |
| DE | 19736951 | 3/1999 |
| DE | 19920451 A1 | 5/1999 |
| DE | 19805174 | 6/1999 |
| DE | 198 10 936 | 9/1999 |
| DE | 19920451 | 12/1999 |
| DE | 10001314 A1 | 1/2000 |
| DE | 19954978 | 1/2001 |
| DE | 10013492 | 9/2001 |
| DE | 10024880 | 9/2001 |
| DE | 10030708 | 1/2002 |
| DE | 10144839 | 3/2003 |
| DE | 10241571 | 3/2004 |
| DE | 10261902 | 8/2004 |
| DE | 10316732 | 10/2004 |
| DE | 10338525 | 3/2005 |
| DE | 10346064 | 4/2005 |
| EP | 0 128 534 | 12/1984 |
| EP | 0 280 213 | 8/1988 |
| EP | 411375 A1 * | 2/1991 |
| EP | 0517615 | 12/1992 |
| EP | 411375 | 5/1994 |
| EP | 0730720 | 11/1994 |
| EP | 0809576 | 2/1996 |
| EP | 0809576 | 5/1999 |
| EP | 0936105 | 8/1999 |
| EP | 1088696 | 9/2000 |
| EP | 1050429 | 11/2000 |
| EP | 1075984 | 2/2001 |
| EP | 1123834 | 2/2001 |
| EP | 1088696 | 4/2001 |
| EP | 1266794 | 12/2002 |
| EP | 1323573 | 7/2003 |
| EP | 1349746 | 8/2005 |
| FR | 1266925 | 9/1960 |
| FR | 2599683 | 6/1986 |
| FR | 2630056 | 10/1989 |
| FR | 2694527 A1 | 2/1994 |
| FR | 2845318 | 4/2004 |
| JP | 1171509 | 7/1989 |
| JP | 5277020 | 10/1993 |
| JP | 8285423 | 1/1996 |

| | | |
|---|---|---|
| JP | 8285423 | 11/1996 |
| JP | 10044756 | 2/1998 |
| JP | 2000125990 | 2/2000 |
| JP | 2001071800 | 3/2001 |
| JP | 2002125801 | 5/2002 |
| JP | 2002225539 | 8/2002 |
| JP | 2002234332 | 8/2002 |
| JP | 2003042594 | 2/2003 |
| JP | 2004224108 | 8/2004 |
| JP | 2004283403 | 10/2004 |
| SE | 202556 | 3/1966 |
| SE | 0102983 | 3/2003 |
| WO | WO 91/12150 | 8/1991 |
| WO | WO 94/09684 | 5/1994 |
| WO | WO96/05475 | 10/1995 |
| WO | WO 96/05475 | 2/1996 |
| WO | WO 97/09908 | 3/1997 |
| WO | WO99/00268 | 1/1999 |
| WO | WO 99/00268 | 1/1999 |
| WO | WO02/05341 | 1/2002 |
| WO | WO02/06914 | 1/2002 |
| WO | WO 02/005341 | 7/2002 |
| WO | WO03/015583 | 2/2003 |
| WO | WO 03/015583 A2 | 2/2003 |
| WO | WO 03/051666 | 6/2003 |
| WO | WO 03/077710 | 9/2003 |
| WO | WO 03/101777 | 12/2003 |
| WO | WO 03/106215 | 12/2003 |
| WO | WO 2004/082989 | 3/2004 |
| WO | WO2004/082989 | 3/2004 |
| WO | WO 2004/028857 | 4/2004 |
| WO | WO 2004/078517 | 9/2004 |
| WO | WO 2004/091966 | 10/2004 |
| WO | WO 2004/091967 | 10/2004 |
| WO | WO 2004/096601 | 11/2004 |
| WO | WO 2004/096602 | 11/2004 |
| WO | WO 2005/021320 | 3/2005 |
| WO | WO 2005/035305 | 4/2005 |
| WO | WO 2005/042299 | 5/2005 |
| WO | WO 2005/042301 | 5/2005 |
| WO | WO 2005/047056 | 5/2005 |
| WO | WO 2005/068253 | 7/2005 |
| WO | WO 2005/110806 | 11/2005 |

OTHER PUBLICATIONS

Automotive Heated Seats—Heated Steering Wheels, IGB Automotive Ltd., received by Assignee W.E.T. Automotive Systems, Jun. 2003.
Automotive Seat Heating Systems, Bauerhin International, received by Assignee W.E.T. Automotive Systems, May 2002.
Co-pending U.S. Appl. No. 09/619,171, Ventilated Seat Having a Pad Assembly and a Distribution Device, Jul. 19, 2000.
Co-pending U.S. Appl. No. 10/434,890, Automotive Vehicle Seat Insert, May 9, 2003.
Co-pending U.S. Appl. No. 10/715,160, Heater for an Automotive Vehicle and Method of Forming Same, Nov. 17, 2003.
Co-pending U.S. Appl. No. 60/428,002, Heater for an Automotive Vehicle and Method of Forming Same, Nov. 21, 2002.
Co-pending U.S. Appl. No. 60/474,835, Heater for an Automotive Vehicle and Method of Forming Same, May 30, 2003.
Co-pending U.S. Appl. No. 60/505,806, Improved Energy Efficient Personal Comfort System and Methods, Sep. 25, 2003.
Copending U.S. Appl. No. 09/755,505, filed Jan. 5, 2001.
Copending U.S. Appl. No. 09/755,506, filed Jan. 5, 2001.
Copending U.S. Appl. No. 09/755,637, filed Jan. 5, 2001.
Excerpt from http://www.seatcomfort.com/semashow1.htm, Specializing in Seat Ventilation and Heating Systems, Seat Comfort Systems Unveils 3 New Seat Heater Products.
Excerpt from http://www.seatcomfort.com/ventilation.htm, Specializing in Seat Ventilation and Heating Systems, Ventilation.
GMT 830 Heating & Ventilation System, IGB Automotive Ltd., Feb. 13, 2003.
International Search Report for Application Serial No. PCT/US03/19929, Oct. 10, 2003.
Komfortabel bei jeder Temperatur.
Seat Heating Systems, Kongsberg Automotive.
Seat Heating Systems, Kongsberg Automotive , believed to be from website http://www.kongsberg-automotive.no/.
Specializing in Seat Ventilation and Heating Systems, Seat Comfort Systems, http://www.seatcomfort.com/semashow1.htm, Jun. 10, 2003.
Copending U.S. Appl. No. 09/619,171, filed Jul. 19, 2000.
Copending U.S. Appl. No. 10/434,890, filed May 9, 2003.
Copending U.S. Appl. No. 10/463,052, filed Jun. 17, 2003.
Copending U.S. Appl. No. 10/715,160, filed Nov. 17, 2003.
Copending U.S. Appl. No. 10/822,405, filed Apr. 12, 2004.
Copending U.S. Appl. No. 10/822,518, filed Apr. 12, 2004.
Copending U.S. Appl. No. 10/966,652, filed Oct. 15, 2004.
Copending U.S. Appl. No. 10/966,653, filed Oct. 15, 2004.
Copending U.S. Appl. No. 11/001,294, filed Dec. 1, 2004.
Copending U.S. Appl. No. 11/043,600, filed Jan. 26, 2005.
Copending U.S. Appl. No. 11/077,440, filed Mar. 10, 2005.
Copending U.S. Appl. No. 11/186,076, filed Jul. 21, 2005.
Copending U.S. Appl. No. 11/263,642, filed Oct. 31, 2005.
Copending U.S. Appl. No. 60/428,002, filed Nov. 21, 2002.
Copending U.S. Appl. No. 60/474,835, filed May 30, 2003.
Copending U.S. Appl. No. 60/505,806, filed Sep. 25, 2003.

* cited by examiner

AUTOMOTIVE VEHICLE SEAT INSERT

CLAIM OF PRIORITY

The present application claims the benefit of U.S. provisional application No. 60/512,230, filed on Oct. 17, 2003.

FIELD OF THE INVENTION

The present invention relates to a sealed insert for providing heating, ventilation or a combination thereof to a seat of an automotive vehicle.

BACKGROUND OF THE INVENTION

For many years the transportation industry has been concerned with designing seats for automotive vehicles that provide added comfort to occupants in the seats. Various innovations in providing seating comfort are discussed in U.S. Pat. Nos. 6,064,037; 5,921,314; 5,403,065; 6,048,024 and 6,003,950, all of which are expressly incorporated herein by reference for all purposes. In addition, other innovations in providing seating comfort are discussed in U.S. patent application Ser. No. 09/619,171, filed Jul. 19, 2000, titled "Ventilated Seat Having a Pad Assembly and a Distribution Device"; U.S. patent application Ser. No. 09/755,505, filed Jan. 5, 2001, titled "Ventilated Seat"; and U.S. patent application Ser. No. 09/755,506, filed Jan. 5, 2001, titled "Portable Ventilated Seat", each of which are expressly incorporated herein by reference for all purposes. In the interest of continuing such innovation, the present invention provides an improved sealed insert for an automotive vehicle seat for assisting in providing comfort control to an occupant in the seat.

SUMMARY OF THE INVENTION

According to the present invention, there is disclosed a sealed insert for providing heating and ventilation to an automotive vehicle seat. The insert includes a middle layer sandwiched and between a forward layer and a rearward layer and sealed about a peripheral edge. The forward layer, the rearward layer or both preferably include a first opening and a plurality of second openings. Moreover, the middle layer preferably defines an open space in fluid communication with the first opening, the plurality of second openings or both.

According to one embodiment, the vehicle seat includes a seat cushion component and a seat backrest component, at least one of which is ventilated. Each ventilated component includes an air-permeable trim surface at the occupant contact areas of the seat and a cushion. The insert is located beneath the trim surface of each ventilated component and the insert includes an extension with the first opening defined therein. The extension preferably extends through a forward and a rearward surface of the cushion of the ventilated component and an air mover is attached to the extension of the insert in fluid communication with the open space of the insert. In one highly preferred embodiment, the insert includes a body portion from which the extension extends and the extension is contoured as it extends away from the body portion. In another embodiment, the air mover is fastened to lumbar guide wires of the automotive vehicle seat

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF THE INVENTION

The present invention is predicated upon providing an insert suitable for placement within an automotive vehicle seat to provide heating, ventilation or a combination thereof to an occupant in the seat. The insert will typically include multiple (e.g., three) layers and each of the layers may include one or more sub-layers. The insert preferably includes an extension that extends to a backside of a seating component (e.g., a backrest or seat support component) of the seat. As an example, the extension may extend through a cushion of the seat to a backside of the cushion. The extension of the insert typically connects the insert to a fan for providing ventilation. Advantageously, the extension can be shaped to allow the fan to be attached to various parts such as a frame or lumbar guide wires of a vehicle seat. One exemplary insert that may be employed in the present invention is disclosed in U.S. patent application Ser. No. 10/434,890, filed May 9, 2003, which is hereby incorporated by reference for all purposes.

Referring to FIGS. 1 and 3-5, there is illustrated an exemplary insert 10 suitable for placement within a seat of an automotive vehicle. The insert 10 preferably includes a plurality of layers that may be separate but are preferably attached to each other to form the insert. In the embodiment shown, the insert 10 includes a first or forward layer 14 (e.g., the layer of the insert configured to be closest an occupant of the seat), a second or middle layer 16 and a third or rearward layer 20 (e.g., the layer of the insert configured to be furthest from the occupant of the seat).

Figure 1:
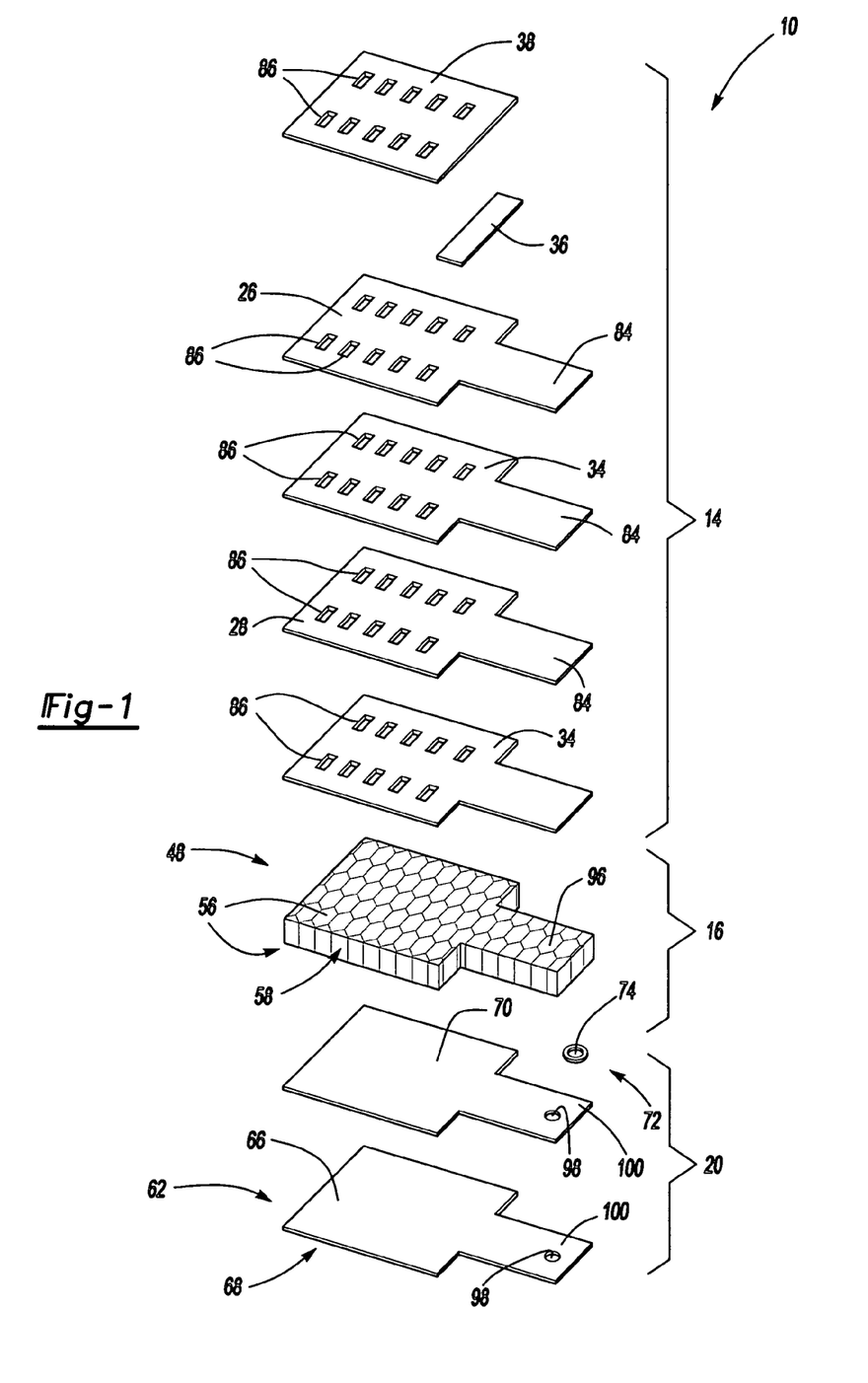
FIG. 1 is a blown up perspective view of a seat insert in accordance with an exemplary aspect of the present invention.

It is preferred that one of the layers 14, 16, 20 includes a heater. In the embodiment depicted, the forward layer 14 includes a heater sub-layer 26, which is preferably laminated to a gas barrier sub-layer 28 (e.g., a film, a textile or otherwise) although such film is not necessarily required. Various different types of heaters are suitable for incorporation into a car seat and it is contemplated that any of such heaters may be incorporated into the insert 10 of the present invention. Such heaters typically incorporate flexible electrical heating elements that are preferably thin, flat, non-obtrusive or a combination thereof. As examples, a lay-wire heater, a carbon fiber heater, a positive thermal coefficient (PTC) heater, a thermoelectric heater or the like, which are typically supported with a backing (e.g., a cloth or fabric type backing) may be used within the insert. In a preferred embodiment, the heater sub-layer 26 is a carbon fiber type heater with a backing (e.g., a nonwoven layer). One exemplary preferred heater is sold under the tradename CARBO-TEX® and commercially available from W.E.T Automotive Systems, Inc. in Germany and/or FTG Fraser-Technik GmbH, Schleizer Strasse 56-58, D-95028 Hof/Saale, Germany. An example of such a heater is disclosed in U.S. Pat. No. 6,064,037, issued May 16, 2000, herein expressly incorporated by reference for all purposes.

The barrier sub-layer 28 is typically formed of a plastic or polymeric material that softens or melts upon exposure to heat to assist the sub-layer 28 to adhere to one or more other layers or sub-layers. Alternatively, the barrier sub-layer 28 may be formed of fabrics, woven materials (e.g., goretex or microfibers), nylon, closed pore foam or other materials. Preferably, the barrier sub-layer 28 is substantially impermeable to fluids and particularly air such that the sub-layer 28 can assist in forming an air barrier as will be described further herein. Dimensionally, for a film barrier sub-layer, it is preferable for the film thickness to be about 0.1 mm to about 2.0 mm thick and more preferably about 0.7 mm to about 1.0 mm thick. Of course, it is contemplated that the film sub-layer 28 may have a variable thickness and may be outside of the aforementioned ranges.

The first layer 14 also includes one or more buffer sub-layers, one or more adhesives or adhesive sub-layers, one or more tape sub-layers, one or more porous foam layers or a combination thereof. Adhesive may be supplied in layers, drops or in a variety of other configurations. Preferably, the buffer layer is at least partially formed of an insulating material.

In the preferred embodiment depicted, the first layer 14 includes two adhesive sub-layers 34, one strip of tape 36 and one buffer sub-layer 38. The adhesive sub-layers 34 are preferably formed of a hot melt adhesive although not necessarily required.

According to an alternative embodiment, it is contemplated that the first layer 14 may also include an air-permeable layer (not shown) between the buffer sub-layer 38 and an occupant of the seat. The air-permeable layer, which may be any one of a variety of air-permeable materials (such as reticulated foam, for example) may be able to help distribute air under the occupant.

One of the layers 14, 16, 20, preferably the middle layer 16, includes a spacer sub-layer 48 formed of a spacer material. In the preferred embodiment depicted, the middle layer 16 includes only the spacer sub-layer 48, however, it is contemplated that additional sub-layers (e.g., adhesive sub-layers) or other materials (e.g., adhesives) may be incorporated into the middle layer 16. The particular sub-layer 48 shown is formed of polymeric (e.g., polyester) strand material that is interwoven to provide opposing honeycomb structures 56 (e.g., fabric panels), which are interconnected by several additional polymeric strand materials to provide open space 58 between the structures 56 while still providing cushion and support. As an example, one preferred material is sold under the tradename 3MESH® and is commercially available from Müller Textil GmbH, Germany or Müller Textiles, Inc., Rhode Island, USA.

In another of the layers 14, 16, 20 of the insert 10, preferably the rearward layer 20, there is included an outer protective or buffer sub-layer and another barrier sub-layer. In the embodiment shown, one integrated sub-layer 62 provides the both the barrier sub-layer 66 and the outer protective sub-layer 68 although they may be provided separately. The barrier sub-layer 66 for the rearward layer 20 may be the same or different than the barrier sub-layer 28 of the forward layer 14.

Preferably, the protective sub-layer 68 is formed of a fleece material, however, various other materials may be used such as gauze, cloth, fabric or the like. It is also preferable for the rearward layer 20 to include an adhesive or adhesive sub-layer 70 similar to or the same as those discussed in relation to the forward layer 14. According to a preferred embodiment, the adhesive sub-layer 70 is provided integrally with the integrated sub-layer 62.

In a highly preferred embodiment, an attachment component 72 is included in one of the layers 14, 16, 20. The attachment component 72 shown in FIG. 1 is a frame member that preferably defines an opening or through-hole 74. It is contemplated that the frame member may be in a variety of configurations (e.g., annular, rectangular, square, geometric or otherwise) and may be formed of a variety of preferably rigid or semi-rigid materials (metal, plastic or the like).

Notably, several of the materials of the various layers and sub-layers of the insert 10 may be environmentally friendly. For example, and without limitation, the materials of the spacer sub-layer 48, the buffer and protective sub-layers 38, 68 and the barrier sub-layers 28, 66 may be recyclable.

Assembly

Generally, for forming a vehicle seat insert according to the present invention, it is contemplated that the various layers and sub-layers of the insert as described above may be combined in a variety of sequences and according to a variety of protocols and technique as long as the insert is or becomes sealed about its periphery. Thus, the order in which the various layers and sub-layers are combined and the techniques of combining should not in any way limit the present invention unless such order or techniques is specifically claimed. Moreover, it is also contemplated that there may be greater or fewer layers and that each layer may include greater or fewer sub-layers.

Figure 2:
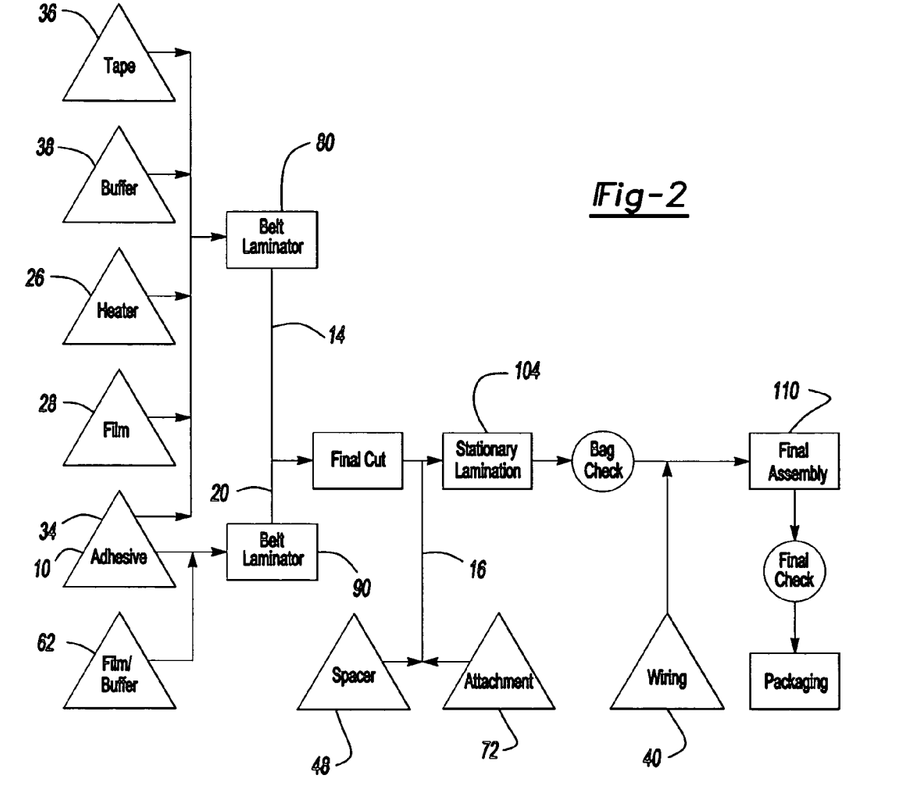
FIG. 2 is a flow diagram for producing seat inserts in accordance with an exemplary aspect of the present invention.

According to a preferred method, the sub-layers of the front or first layer and the third or rearward layer are each laminated separately followed by laminating the front layer to the rearward layer with the middle layer in between. Referring to FIGS. 1 and 2, the first layer 14 is formed according to a preferred method by feeding the various sub-layers 38, 36, 34, 26, 28 to a laminator 80 (e.g., a belt and roller laminator).

Figure 3:
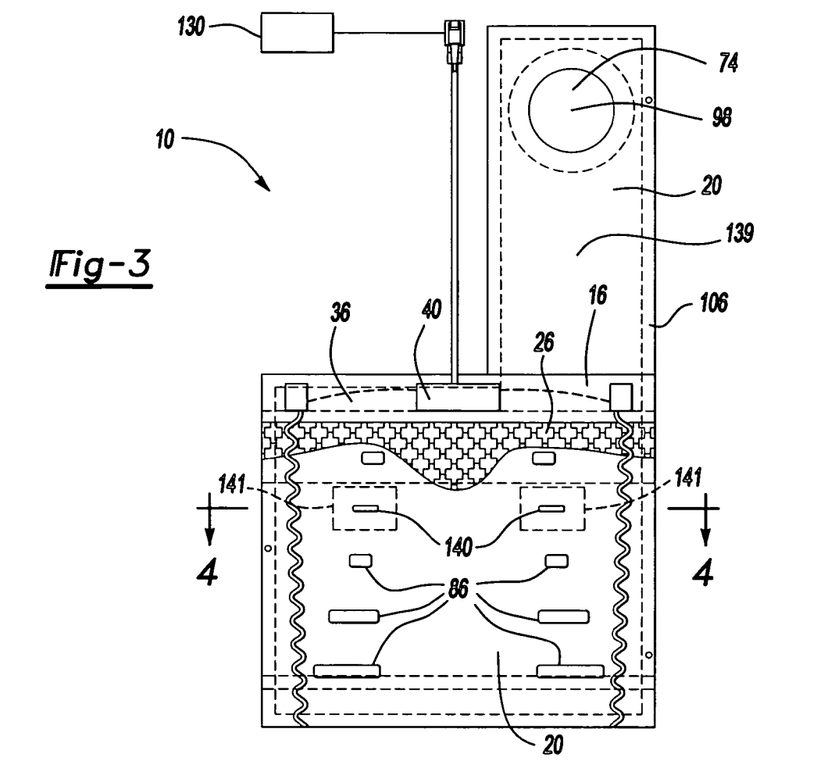
FIG. 3 is a partially cut-away elevational view of the seat insert of FIG. 1 after assembly of the insert.

The sub-layers 36, 38, 34, 26, 28 are preferably fed to the laminator 80 from rolls or otherwise and are cut to shape to form the first layer 14 after lamination. The first layer 14 may be cut to nearly any desired shape or configuration. In the illustrated embodiment, the first layer 14 is cut to be generally rectangular and to include an extension 84 and a plurality of through-holes 86. In FIG. 1, the through-holes 86 are arranged in a generally rectangular configuration and are each substantially the same size. In FIG. 3, however, the through-holes 86 are shown in a preferred configuration as progressively becoming larger from one side of the insert 10 to another.

Referring to FIG. 3, the through-holes 86 preferably increase in size as the distance of the holes from the fan increases. This increase in size can provide a more uniform flow of air throughout the insert 10. It is believed that the increase in the total cross-sectional area of through-holes 86 as the distance from the fan increases allows air to enter or exit the openings at a more uniform rate than if the cross-sectional areas of through-holes at different distances from the fan were equal.

The rearward layer 20, like the front layer 14, may be formed by attaching it sub-layers 62, 70 in a lamination process. Referring again to FIGS. 1 and 2, the barrier sub-layer 66, the protective sub-layer 68 and the adhesive sub-layer 70 are fed to a laminator 90 (e.g., a belt laminator) such that the barrier sub-layer 66 is between and attached to the adhesive sub-layer 70 and the protective sub-layer 68. Thereafter, the rearward layer 20 is cut to have a shape substantially corresponding to the first layer 14. Of course, it is contemplated that the rearward layer may be cut into a variety of other configurations as well. Preferably, the rearward layer 20 includes a through-hole 98 as shown in FIG. 3 through an extension 100 of the rearward layer 20 that corresponds to the extension 84 of the first layer 14. It is contemplated, however, that the through-hole 98 may also be formed in the forward layer 14 if desired.

Once the middle layer 16 has been appropriately cut or otherwise shaped to the proper configuration, which preferably corresponds to the forward and rearward layers 14, 20, each of the layers 14, 16, 20 are laminated together to attach the layers 14, 16, 20 to each other. As shown, the middle layer 16 may be cut to include an extension 96 corresponding to the extensions 84, 100.

In the preferred embodiment, the layers 14, 16, 20 are laminated in a stationary lamination device 104 at elevated temperatures such that the adhesive sub-layer 70 of the rearward layer 20 and the outermost adhesive sub-layer 34 of the forward layer 14 both adhere and attach the forward layer 14 and the rearward layer 20 to the middle layer 16 (e.g., the honeycomb structure). At the same time, the barrier sub-layer 28 of the front layer 14 and the barrier sub-layer 66 of the rearward layer 20 are adhered to one another about an outer peripheral strip 106 of the insert 10. For desirably locating the strip 106 (i.e., closer to the rearward layer, the forward layer or somewhere therebetween), it is contemplated that the forward or rearward layers may be cut slightly larger or smaller than each other or they may be the same size.

It is also preferred that the attachment component 72 be sandwiched and attached between at least portion of the rearward layer 20 and the middle layer 16 although the attachment component may be otherwise attached (e.g., retrofit, fastened, or the like). Advantageously, the adhesive sub-layers 34, 70 and the outer laminated peripheral strip 106 separately and together assist in forming the insert 10 as a tightly integrated unit wherein the layers 14, 16, 20 are substantially immobile relative to each other.

While pre-cutting the layers 14, 16, 20 followed by laminating the peripheral edges of at least two of the layers 14, 20 have been discussed, it is contemplated that cutting of the layers 14, 16, 20 and laminating of the layers may be integrated into a single processing step. For example, it is contemplated that supplies (e.g., rolls) of each of the layers 14, 16, 20 may be provided to a machine that laminates outer edges of each of the layers 14, 16, 20 together for forming the peripheral strip 106 as the supplies continuously or intermittently provide the layer 14, 16, 20 to the machine. Thus, inserts 10 may be formed by cutting the inserts 10 with the peripheral strip 106 from the laminated layers 14, 16, 20 and such cutting may be performed by the laminating machine or by another cutting machine or device. In such an embodiment, it is contemplated that the through-holes in the forward layer 14 and the through-hole in the rearward layer may be formed prior to, during or after lamination forming the outer peripheral strip 106.

It is also contemplated that additional cutting or laminating steps may also be employed. For example, it is contemplated that the layers, the sub-layers or both may be partially cut or shaped prior to stationary or other lamination and further cut or shaped after such lamination.

Figure 5:
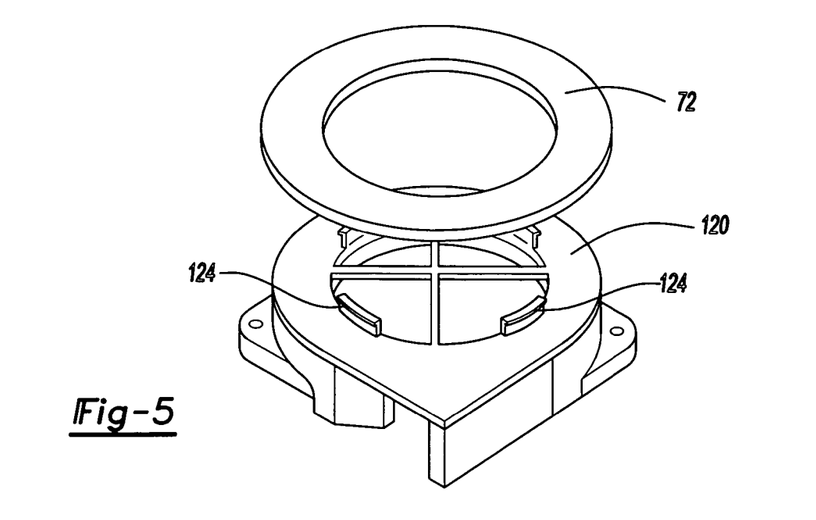
FIG. 5 is a perspective view of an exemplary fan suitable for application in the insert of the present invention.

During final assembly 110, the wire harness 40 is preferably inserted within the pocket formed by the tape 36 or otherwise attached to the insert 10. Also, a fan, the housing 120 of which is shown in FIG. 5, is preferably attached to the attachment component 72 of the insert 10. In the embodiment shown, the housing 120 include flanges 124 suitable for snap-fitting the housing 120 to the attachment component 72. In this manner, the fan can be attached to the rest of the insert 10 and can be placed in fluid communication with the through-holes 86 of the first layer 14, the open space 58 of the middle layer 16 and the through-hole 98 of the rearward layer 20. Advantageously, the attachment component 72 and flanges 124 provide a unique and efficient method of attaching the fan to the insert 10. It is contemplated however, that various other methods of attachment (e.g., fasteners, sewing, mating threaded attachments, quick connects or the like) may be used to attach the fan to the insert 10. It is also contemplated that the attachment component 72 and the housing 120 and flanges 124 of the fan may be varied within the scope of the present invention.

For assembly of the insert 10 to a vehicle seat (not shown), the insert 10 is preferably connected (e.g., sewn, adhered or otherwise attached) to a portion of the seat such as the cover (e.g., a perforated leather cover) or to a cushion (e.g., foam) of the seat. In one preferred embodiment, a seat cover may be configured to include a pocket for receiving the insert 10. Alternatively, it is contemplated that hook and loop fasteners may be utilized to attach the insert 10 to portions (e.g., the cover or foam) of the seat. For example, a strip of hook and loop fastener may be attached (e.g., adhered) to the insert and another strip of hook and loop fastener may be attached (e.g., adhered) to the foam cushion within a trench. Thus, the strips can be fastened to each other thereby attaching the insert to the cushion.

The insert 10 is preferably positioned in the seat such that the first layer 14 is closer to the outer seat cover relative to the rearward layer 20 although not necessarily required. It is also preferable for an extension 139 formed by the extensions 84, 96, 100 of the layers 14, 20 to extend behind, in front of or through the cushion of the seat such that the fan may be attached to a portion of the frame of the vehicle seat. Of course, attachment of the insert to the fan and attachment of the fan to the seat or other portion of the vehicle may be accomplished in any order.

Preferably, the extension 139 is a tubular structure for providing fluid communication between the open space of the spacer layer 48 and the fan. Additionally, the wire harness 40, the heater sub-layer 26, the fan or a combination thereof are preferably connected in signaling communication with a control unit 130 and/or each other. The control unit 130 may be separate from or integrated into the vehicle.

Moreover, while the air movers are typically shown as being configured for connecting to the extension of the insert. It is also contemplated that an air mover may be otherwise located relative to the insert. For example, a fan might be attached to a main or body portion of the insert and the fan may be attached to the foam cushion of the seat. In such an embodiment, it would typically be desirable to provide fluid communication to the fan, for example, by providing an opening in the foam cushion.

Figure 4:
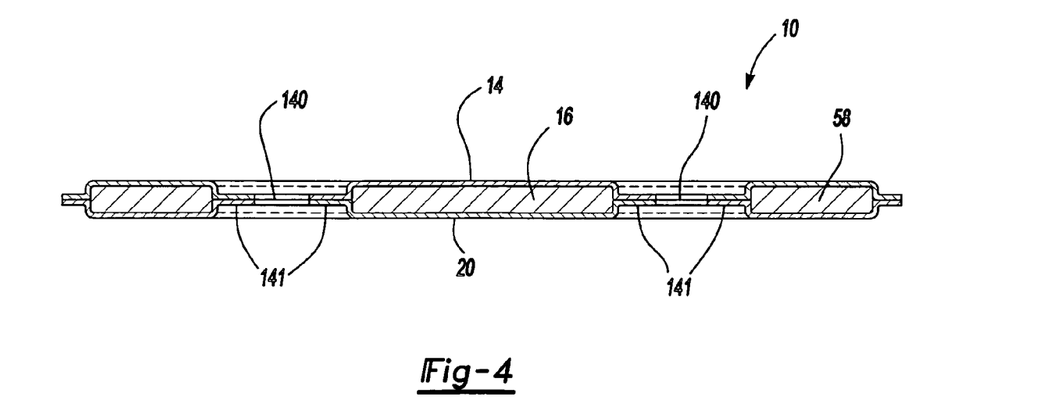
FIG. 4 is a sectional view of the insert of FIGS. 1 and 3 taken along line 4-4 in FIG. 3.
Figure 6:
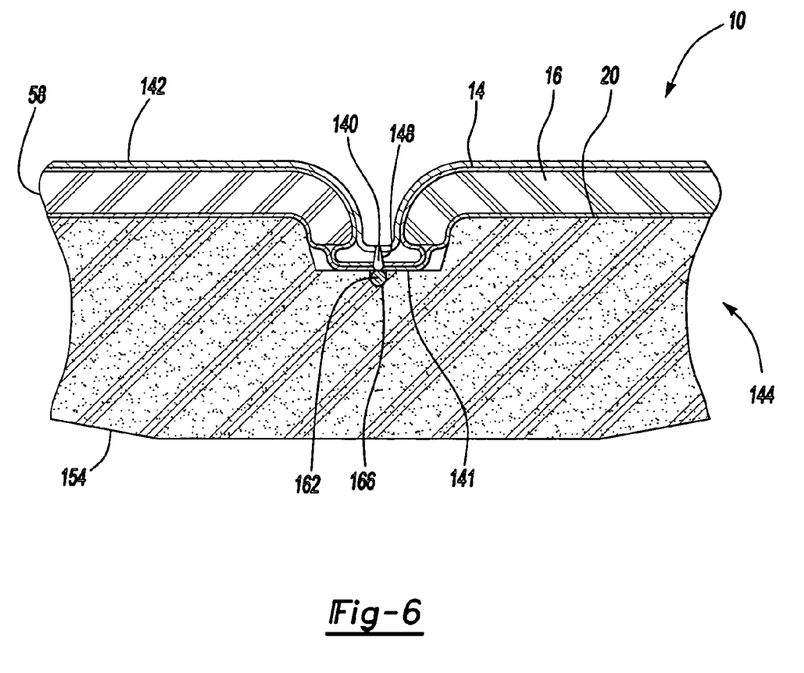
FIG. 6 is a sectional view of the insert attached in an exemplary manner to a seat of an automotive vehicle according to the present invention.

In one embodiment referring to FIGS. 3, 4 and 6, the insert 10 is formed with one or more (e.g., three) through-holes 140 that extend through the layers, sub-layers or both of the insert 10 such that the through-holes 140 extend entirely or substantially entirely through the insert 10. Preferably, the insert 10 (e.g., the barrier layers 28, 66) have a seal 141 about the through-holes 140 for substantially preventing direct fluid communication between the through-holes 140 and the open space 58 within the insert 10. In the embodiment depicted, the barrier sub-layers 28, 66 are attached to each other during the lamination process to form a substantially air-tight seal 141 about the through-holes 140.

Advantageously, the through-holes 140 can assist in the assembly of the insert 10 and/or a seat cover 142 to a seat 144 of an automotive vehicle. As shown, for each through-hole 140, a portion 148 (e.g., a cushion layer, a felt layer, a leather layer, combinations thereof or the like) of the seat cover 142 is extended through the through-hole 140 and is attached to foam 154 of the seat 144. In the embodiment depicted, the portion 148 is attached to the foam 154 by wrapping or otherwise attaching the portion 148 about a member 162 (e.g., a bar or wire) that is attached to (e.g., at least partially imbedded within) the foam 154. Additionally, one or more loops 166 (e.g., metal loops) are integrated with the portion 148 and are looped about the member 162 for assisting in attaching the portion 148 to the member 162.

It shall be appreciated that, in embodiments alternative to the one depicted, a variety of materials or members such as wire, thread, stitches, fasteners, foam or the like may extend through the through-holes 140 in the insert 10 for assisting in the attachment of the seat cover 142, the insert 10 or both to the other components of the seat 144. Moreover the materials or members may be connected to the seat cover, the foam, the seat frame, other portions of the seat or vehicle or the like depending on the desired configuration. It is also contemplated that other attachment methods such as the use of alternative fastening devices may be employed in addition to or alternative to the through-holes 140. For example, hook and loop fasteners, sewing, adhesives or other fastening devices or mechanisms may be employed to locate the insert 10 relative to the seat cushion, the seat cover 142 or both.

Operation

In operation, the insert of the present invention can preferably provide heating, ventilation or a combination thereof to an occupant of a seat having the insert. In particular, if heat is desired, electric current can be induced to travel through the heater sub-layer 26 by the control unit 130 or otherwise such that the heater sub-layer 26 can provide heat to the occupant.

Alternatively, if ventilation is desired, the fan can be operated via the control unit 130 or otherwise to pull air through the through-holes 86 in the first layer 14 of the insert 10, through the open space 58 of the middle layer 48 of the insert 10 and through the through-hole 98 of the rearward layer 20. Such air preferably flows at least partially past the occupant of the seat and through the seat cover (e.g., a perforated leather seat cover or cloth seat cover) thereby providing ventilation to the occupant and providing convective heat transfer from the occupant to the flowing air.

Although, it may be preferable for only the heater sub-layer 26 or the ventilation system to be running at one time, it is contemplated that both may be operated simultaneously. Moreover, it is contemplated that both the heater sub-layer 26 and the ventilation system may be operated at various levels (e.g., 2 or more levels of output) such as by having a fan that can operate at different levels or by having various levels of electricity flowing through or throughout the heater sub-layer 26. It is also contemplated that the fan may push air into the open space 58 of the insert 10, such as during an initial short duration cool-down period for a vehicle interior (e.g., after the vehicle has been in sunlight or other hot conditions), as well as pulling air from the open space 58 thereafter.

It is also contemplated that one or more temperature sensors (e.g., a thermostat, a thermistor or the like) may be included adjacent the insert, the trim layer or the like. Preferably, any temperature sensors are near the seat cover or the insert for sensing a temperature closely related to (e.g., at or near) a temperature being experienced by an individual in the seat. Such temperature sensors may be in signaling communication with the control unit 130 such that the control unit 130 can control the fan 22, the heater layer 28 or both for attaining or maintaining a desired temperature at areas adjacent the individual and/or the temperature sensor. Moreover, the control unit 130 may be programmed with instructions for commanding the fan 22, the heater layer 28 or both to change output levels (e.g., turn on or turn off) if the temperature sensor senses a temperature above or below one or more threshold levels. An example of such programming is described in a copending patent application titled "AUTOMOTIVE VEHICLE SEATING COMFORT SYSTEM", Ser. No. 60/428,003, filed Nov. 21, 2002 and incorporated herein by reference for all purposes.

Advantageously, the plastic film sub-layers 28, 66 respectively of the first and third layers 14, 20 provide a substantially gas-tight seal about the middle layer 16 (e.g., the spacer sub-layer 48). In this manner, gas flow relative to the open space 58 of the spacer sub-layer 48 is substantially restricted to flowing through the through-holes 86, 98 of the first and third layers 14, 20.

In alternative embodiments, the extension of the insert may extend behind the seat cushion by extending around the seat cushion, extending between two seat cushions, extending through a portion or the entirety of the seat cushion, a combination thereof or the like. Moreover, it is contemplated that the extension may be shaped as desired to assist the extension in extending to a desired location behind the seat cushion. For example, the extension may be arced, angled, contoured, straight or otherwise configured as it extends away from the rest of the insert.

Figure 7:
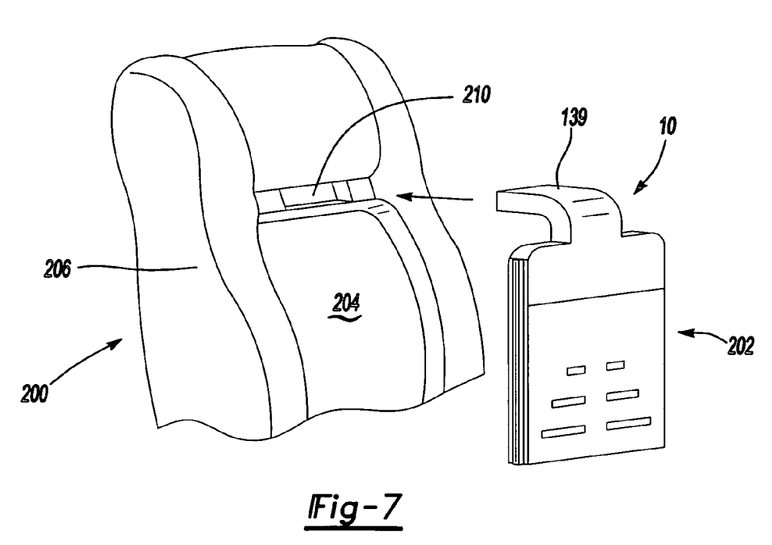
FIG. 7 is a front perspective view of an exemplary insert being assembled to an exemplary backrest component of a vehicle seat.
Figure 8A:
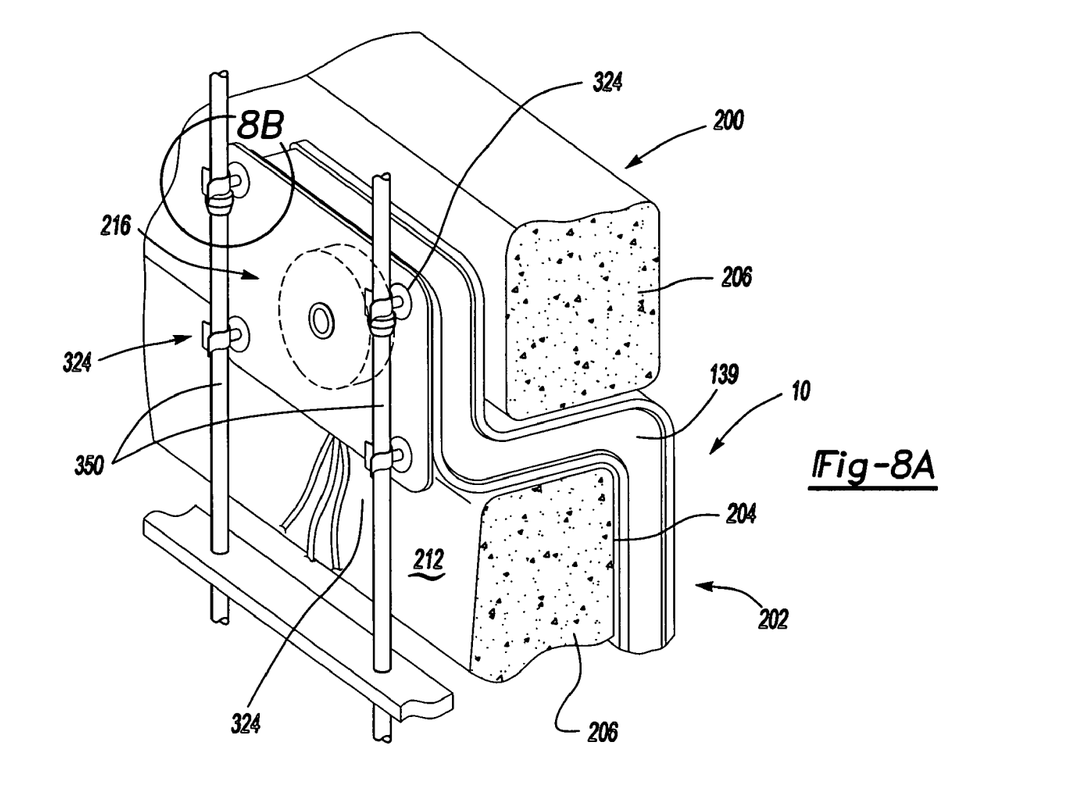
FIG. 8A is a rear cut away perspective view of the exemplary backrest component of FIG. 7 with the exemplary insert assembled thereto.

Referring to FIGS. 7 and 8A, there is illustrated the insert 10 of the present invention assembled to a seat backrest component 200. In the particular embodiment, a body portion 202 of the insert 10 overlays a forward surface 204 of a backrest cushion 206 of the backrest component 200. Preferably, the body portion 202 of the insert 10 is attached to the cushion 206 of the backrest component 200, although it may alternatively be attached to a cover layer or other portion of a seat. Of course, the insert 10 may be attached to the cushion 206 or cover layer using any of the attachments disclosed herein.

As shown, the backrest cushion 206 has an opening 210 (e.g., a slot or through-hole) extending generally through the cushion 206 of the backrest component 200. In particular, the opening 210 extends through the forward surface 204 and a rearward surface 212 of the cushion 206 at a central area of the cushion 206. Advantageously, the opening 210 is sized to receive the extension 139 of the insert 10 and the extension 139 extends into and through the opening 210 and behind the cushion 206 to oppose at least a portion of the rearward surface 212 of the cushion 206. In the embodiment shown, the extension 139 extends to an air mover 216 (e.g., a blower or other fan), which is also located behind the cushion 206.

Referring to FIGS. 9-11B, there is illustrated an alternative insert 220 according to the present invention. The insert 220 is configured in a manner similar to any of the inserts described herein, however, the insert includes an extension 222 that is contoured (e.g., arced or angle) or non-linear as it extends away from a body portion 226 of the insert 220 and the extension 222 extends from a different edge of the body portion 226 of the insert 220 than shown in previous embodiments. In particular, the extension 222 extends from an edge 228 that is configured to be coextensive with or extending substantially parallel to a side edge 230 of a seat cushion 232 or seat cushion component 234 as shown. Moreover, the extension 222 extends outward from the body portion 226 of the insert 220 from a proximate portion 236 to a distal portion 238 with a contoured (e.g., arced, angled or non-linear) portion 240 therebetween. Preferably, the contoured portion 240 arcs to allow at least the distal portion 238 of the extension 222 to substantially coextend or become substantially parallel with the edge 228.

Figure 9:
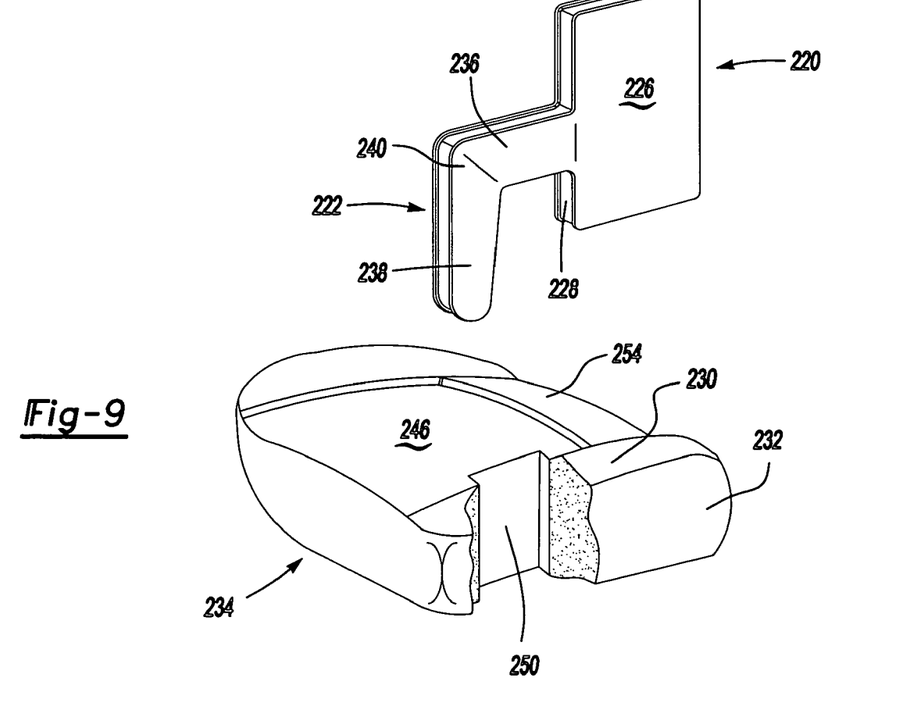
FIG. 9 is a top perspective view of another exemplary insert being assembled to an exemplary partially cut away seat component of a vehicle seat.
Figure 10:
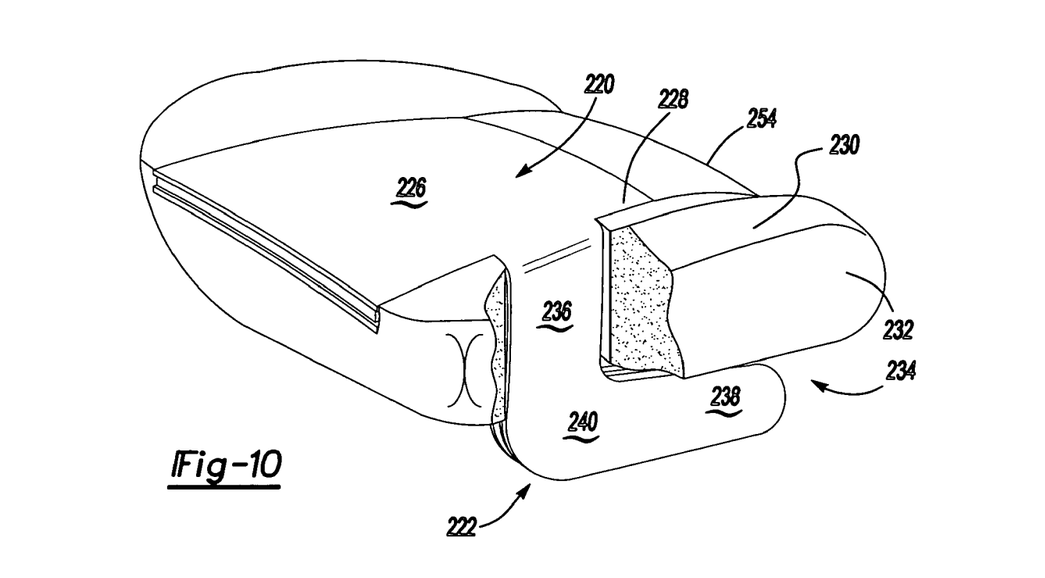
FIG. 10 is a top perspective view of the exemplary insert of FIG. 9 assembled to the exemplary seat component.

As shown, the body portion 226 of the insert 220 overlays a forward surface 246 of the seat cushion 232 of the seat cushion component 234. Preferably, the body portion 226 of the insert 220 is attached to the cushion 232 of the seat cushion component 234, although it may alternatively be attached to a cover layer or other portion of a seat. Of course, the insert 220 may be attached to the cushion 232 or cover layer using any of the attachments disclosed herein.

As shown in cut-away, the seat cushion 232 has an opening 250 (e.g., a slotted through-hole) extending generally through the cushion 232 of the seat cushion component 234. In particular, the opening 250 extends through the forward surface 246 and a rearward surface 254 of the cushion 232 at a side area of the cushion 232. Advantageously, the opening 250 is sized to receive the extension 222 of the insert 220 and the extension 222 extends into and through the opening 250 and behind the cushion 232 to oppose at least a portion of the rearward surface 250 of the cushion 232.

In the embodiment shown, the extension 222 extends to an air mover (e.g., a blower or other fan), which is also located behind the cushion 232. As an added advantage, the contoured portion 240 allows the extension 222 to extend toward a forward edge 254 of the seat cushion 232 and/or seat cushion component 234. It should be understood, however, that such a contoured portion 240 may be configured to allow the extension 222 to extend toward any desired location.

It should be understood that in any of the embodiments disclosed herein, steps used to assemble the insert to a cushion component may be carried out in any desired order. For example, the insert may be attached to the cushion component followed by extending the extension through the cushion opening. Alternatively, the extension may be extended through the cushion first.

Preferably, the air mover is attached to a component that maintains a substantially identical location with respect to a seat or backrest cushion to which the insert is applied particularly during adjustment of the cushion position or seat. Of course, it is contemplated that the location of the air mover may change relative to the seat or backrest cushion as well.

Figures 12, 13:
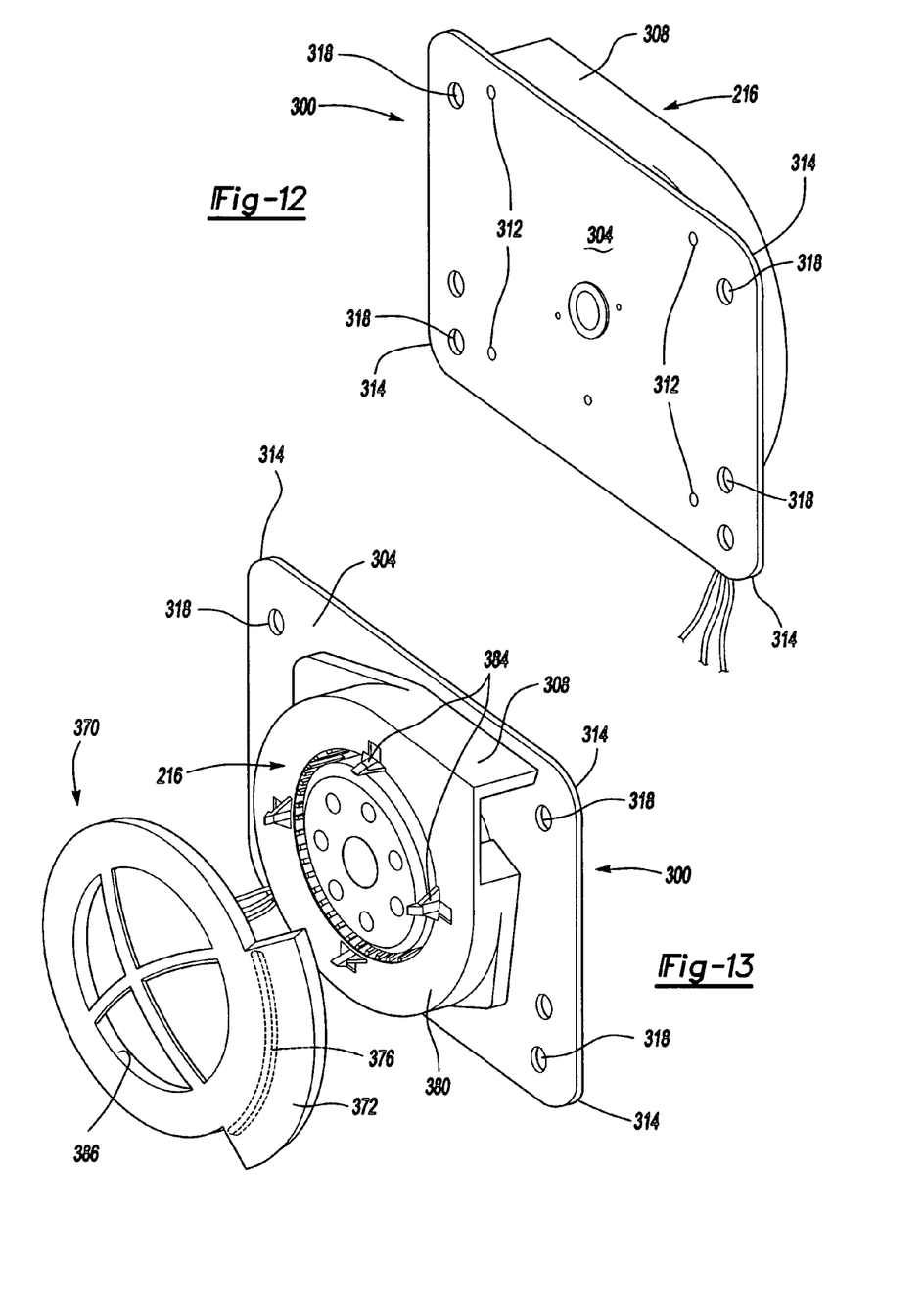
FIG. 12 is a rear perspective view of an exemplary fan assembly according to the present invention.
FIG. 13 is a front perspective view of the exemplary fan assembly of FIG. 12.

Referring to FIGS. 12 and 13, there is illustrated one exemplary fan assembly 300 according to the present invention. The assembly 300 includes the fan 216 attached to a mounting structure 304. In the particular embodiment shown, the fan 216 includes a housing 308 (e.g., a plastic housing) that is attached to the mounting structure 304 with a plurality of fasteners 312 (e.g, screws). The mounting structure 304 is shown as a substantially rectangular metal plate with rounded off corners 314 and a plurality of openings 318 (e.g., through-holes) extending through the plate, one opening 318, adjacent each corner 314. Of course, it is contemplated that a variety of structures other than plates may be employed as the mounting structure and a variety of materials (e.g., plastics, fabrics or the like) may be employed for forming the structure in a variety of alternative configurations.

Figure 8B:
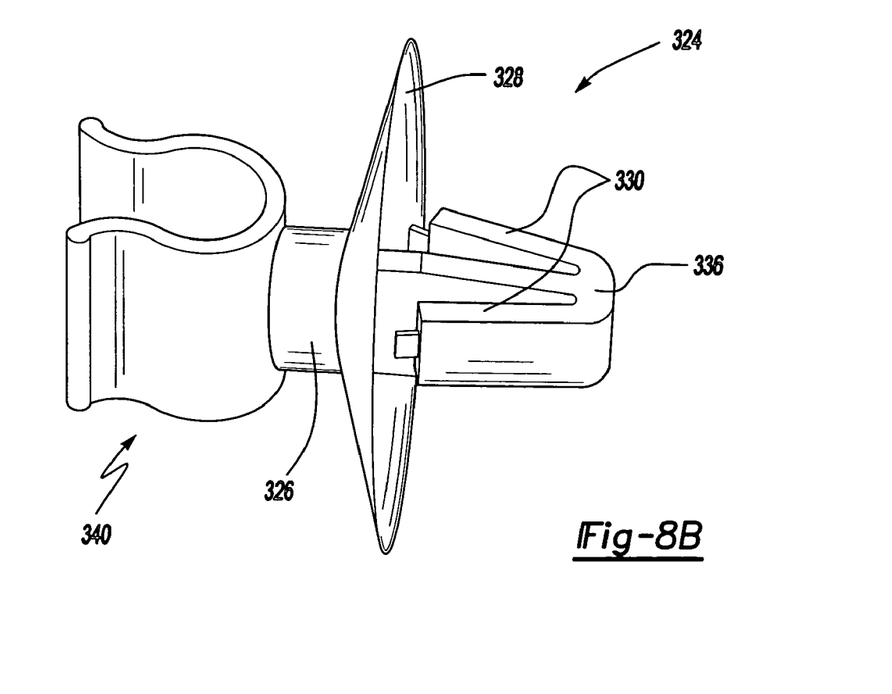
FIG. 8B is a perspective view of an exemplary fastener, which is employed for attaching an air mover assembly to a seat.

The assembly 300, as shown in FIG. 8A also includes one or more fasteners 324 attached thereto. As shown in FIG. 8B, each fastener 324 includes a body portion 326 with projections 328, 330 extending therefrom for interference fitting the fastener 324 to the mounting structure 304. In the embodiment shown, each fastener 324 includes a pair of projections 330 extending from an end 336 of the fastener 324 and a conical projection 328. Preferably the pair of projections 330 and the conical projection 328 extend at least partially toward each other, although not required.

Each fastener 324 also includes a fastening mechanism 340 for attaching the fastener 324, the fan assembly 300 or both to one or more components of the seat or other portion of the automotive vehicle. Preferably, the fastening mechanism 340 can be attached by interference fit, adhesion, magnetism or otherwise. In the particular embodiment depicted, the fastening mechanism 340 is a C-shaped clip configured for forming an interference fit. It is generally contemplated that the fastening mechanism may be fitted with a locking mechanism (not shown) to enhance the ability of the fastening mechanism 340 in attaching to members.

In FIG. 8A the fan assembly 300 is attached to a pair of members 350 that extend substantially parallel to the back surface 212 of the backrest component 200. As shown, the members 350 extend substantially vertically when the backrest component 200 is in the upright position, although they may extend in a variety of directions depending upon the members 350 employed and the seat configuration. In the particular embodiment illustrated, the members 350 are cylindrical metal wires that form a portion of a lumbar guide or back support adjustment assembly. Preferably, the members 350 are substantially stationary relative to the backrest component 200, although not required.

For attaching the fan assembly 300 to the members 350, the end 336 and projections 330 of the fasteners 324 are extended through the openings 318 of the mounting structure 304 until the mounting structure 304 is interference fit between the pair of projections 330 and the conical projection 328. Also, the fastening mechanisms 340 of each of fasteners 324 are interference fit (e.g., at least partially clipped about) the members 350.

As shown, the mounting structure 304 is between the members 350 and the cushion 206. In an alternative embodiment, however, the mounting structure 304 may be located on a side of the members 350 away from the cushion 206. In such an embodiment, the fasteners 324 would have to be reversed such that the fastening mechanisms 340 extend toward the cushion 206 and the fan 216 would be located at least partially between the members 350. Advantageously, such an embodiment can provide for greater space between the fan 216 and the cushion 206 for allowing air to flow to or from the fan 216 more easily.

Figure 11A:
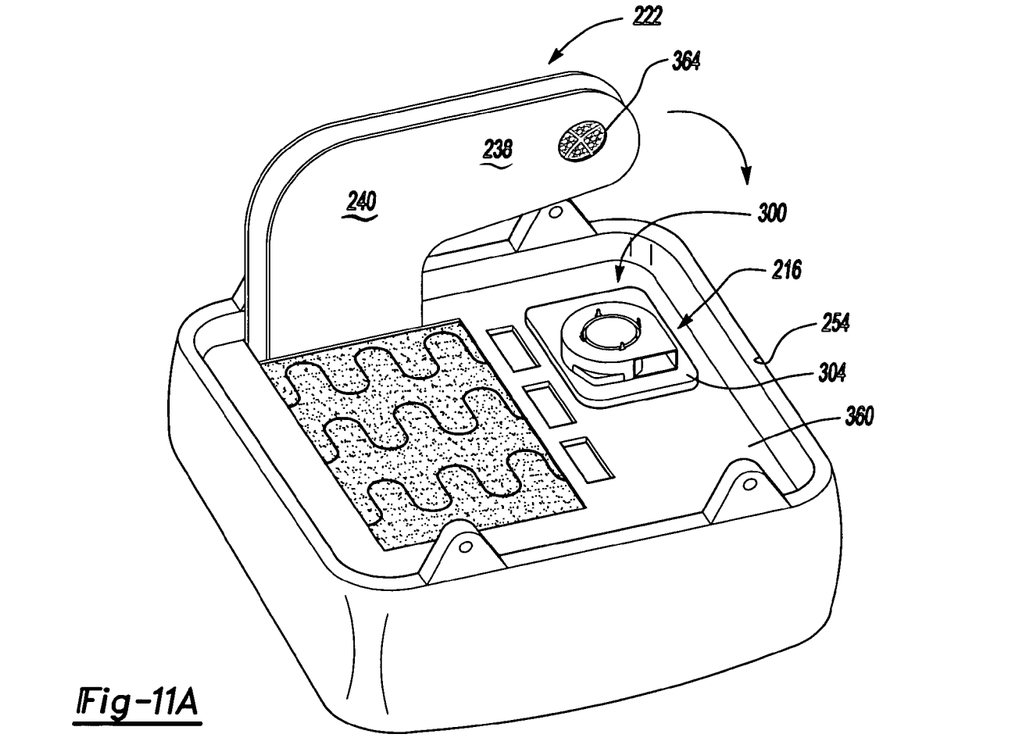
FIG. 11A is a bottom perspective view of the exemplary seat component of FIG. 9 during assembly.
Figure 11B:
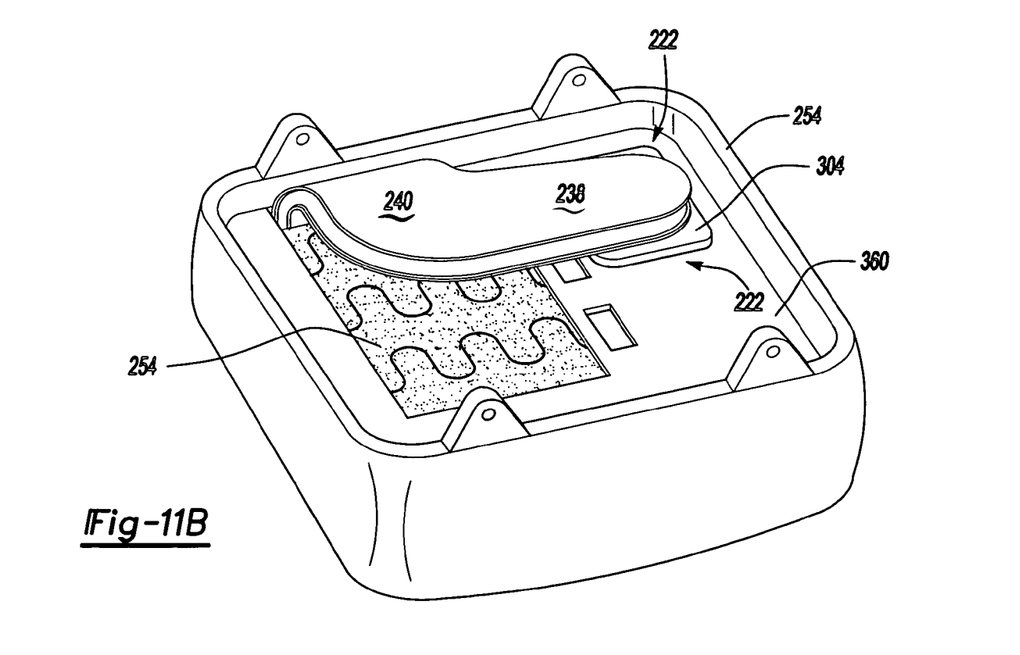
FIG. 11B is another bottom perspective view of the exemplary seat component of FIG. 9 after assembly.

Referring to FIGS. 11A-11B, the fan assembly 300 is attached to a support frame 360 for the cushion 232. As depicted, the mounting structure 304 is attached to the support frame 360 and an opening 364 (e.g., a through hole) extending into the insert 220 is placed in fluid communication with the fan 216. It is contemplated, however, that the fan 216 may be directly attached to the support frame 360 and the mounting structure 304 may be removed. Moreover, the support frame 360, particularly when molded of plastic, can be molded to specifically receive the fan 216 and assist in its attachment thereto.

While is contemplated that any of the inserts or extensions may be attached to the fan using the ring 72 of FIG. 5, it is also possible to design a ring, which aids in the assembly of the insert to the fan. As an example, there is a ring 370 illustrated in FIG. 13 having an extension 372 (e.g., a semi-circular extension) extending from the ring 370 and a lip 376 located adjacent an interface of the ring 370 and the extension 372. As shown, the extension 372 extends away from the ring 370 in the same plane as the ring 370 and the lip 376 extends from the extension 372 at least partially perpendicular to the plane of the ring 370 and the extension 372. Thus, the lip 376 is configured for extending outwardly away from any insert into which the ring 370 is installed.

To assemble the ring 370 and the insert when attached to the ring 370 to the fan 216, the lip 376 can be abuttingly engaged with the housing 308 of the fan 216 adjacent an edge 380 of the housing 308. In turn, the ring 370 is aligned with fasteners 384 of the fan 216 such that the ring 370 may be snap-fit to an inner annular edge 386 of the fasteners 384 as described previously with regard to the ring 72 of FIG. 5.

It should be recognized that various alternative attachments other than the rings described may be employed to attach the air movers to the inserts. For example, attachments such as twist locks, spring locks, tabs on a ring, tabs on the air mover housing, combinations thereof or the like may be employed. It should be further recognized that the air mover, the snap ring or both can include protective equipment such as fingerguards (e.g., cross-bars) or the like.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A ventilated seat for a vehicle, comprising:
    a vehicle seat having a seat component and a backrest component, at least one of which is ventilated, each ventilated component having an air-permeable trim surface at the occupant contact areas of the seat and a cushion, wherein the cushion comprises at least one opening through the cushion;
    an insert located between the trim surface and the cushion of each ventilated component, wherein the insert comprises:
    i) forward barrier layer and a rearward barrier layer made of an air impermeable material where the barrier layers are sealed together along a peripheral edge, wherein the forward barrier comprises a plurality of ventilation holes and the rearward barrier comprises at least one port; and
    ii) a spacer material located between the barrier layers and defining an open space that permits fluid communication between the cushion and the trim surface of the ventilated component, wherein the spacer material is less than coextensive with the barrier layers;
    iii) a heater layer integrated into the insert, the heater layer including a laminate for attaching the heater layer to a layer of the insert; and
    a fan in fluid communication with the open space of the insert through the opening in the cushion,
    wherein the spacer material is a polymeric strand material.

2. The ventilated seat of claim 1 wherein the sealed insert is substantially coextensive with the cushion.

3. The ventilated seat of claim 1 wherein the sealed insert is less than coextensive with the cushion.

4. The ventilated seat of claim 3 wherein the barrier layers are sealed together using heat to soften or melt the barrier layers.

5. The ventilated seat of claim 3 wherein the barrier layers are sealed together with an adhesive.

6. The ventilated seat of claim 4 wherein the fan is attached to a frame structure of the seat and wherein the fan both blows air toward the seat occupant or draws air away from the seat occupant.

7. The ventilated seat of claim 5 wherein the ventilated seat component is the seat cushion component.

8. A ventilated seat for a vehicle, comprising:
    a vehicle seat having a seat component and a backrest component, at least one of which is ventilated, each ventilated component having an air-permeable trim surface at the occupant contact areas of the seat and a cushion, wherein the cushion comprises at least one opening through the cushion;
    an insert located between the trim surface and the cushion of each ventilated component, wherein the insert comprises:
    i) forward barrier layer and a rearward barrier layer made of an air impermeable material where the barrier layers are sealed together along a peripheral edge, wherein the forward barrier comprises a plurality of ventilation holes and the rearward barrier comprises at least one port;

ii) a spacer material located between the barrier layers and defining an open space that permits fluid communication between the cushion and the trim surface of the ventilated component, wherein the spacer material is less than coextensive with the barrier layers; and iii) a heater layer integrated into the insert, the heater layer including a laminate for attaching the heater layer to a layer of the insert; and a fan in fluid communication with the open space of the insert through the opening in the cushion.

9. A ventilated seat for a vehicle, comprising:

a vehicle seat having a seat component and a backrest component, at least one of which is ventilated, each ventilated component having an air-permeable trim surface at the occupant contact areas of the seat and a cushion, wherein the cushion comprises a plurality of openings through the cushion;

an insert that is sealed about its peripheral edge located between the trim surface and the cushion of each ventilated component, the insert including an integrated heater, a topside barrier layer, an underside barrier layer and a spacer material comprising a polymeric strand material that defines an open space that provides fluid communication between a first opening in the underside barrier layer and a plurality of second openings in the topside barrier layer of the insert, wherein the integrated heater is located between the topside barrier layer and the underside barrier layer; and an air mover in fluid communication with the open space of the insert through the plurality of openings in the cushion wherein the air mover is attached to one or more components of the seat.

10. The ventilated seat of claim 9 wherein seat comprises at least one second insert that is open at its sides.

11. The ventilated seat of claim 10 wherein the seat further comprises a temperature sensor in signaling communication with a control unit.

12. The ventilated seat of claim 11 wherein the control unit controls the air mover, the integrated heater or both to attain or maintain a desired temperature at areas adjacent the seat occupant or the temperature sensor.

13. The ventilated seat of claim 12 wherein barrier layers are attached to each other using an adhesive or welding.

14. The ventilated seat of claim 13 wherein the integrated heater comprises a flexible electrical heating element.

15. The ventilated seat of claim 14 wherein the ventilated seat component is the seat component.

* * * * *